UNITED STATES PATENT OFFICE.

JOHN J. COLLINS, OF WASHINGTON, DISTRICT OF COLUMBIA.

ELECTROLYTE FOR GALVANIC BATTERIES.

SPECIFICATION forming part of Letters Patent No. 448,936, dated March 24, 1891.

Application filed September 30, 1890. Serial No. 366,651. (No specimens.)

*To all whom it may concern:*

Be it known that I, JOHN J. COLLINS, of Washington, in the District of Columbia, have invented certain new and useful Improvements in Galvanic Batteries; and I do hereby declare that the following is a full, clear, and exact description of the invention, which will enable others skilled in the art to which it appertains to make and use the same.

This invention relates to a certain improved electrolyte for use in galvanic generators; and it consists in the compound or compounds hereinafter specified, and particularly pointed out in the claims.

The electrolyte preferably consists of a mixture of an alkali (preferably common soda or potash) and water, bichromate of potash or bichromate of soda, or a mixture of both, blue-stone, (sulphate of copper,) sulphuric acid, sulphur, (flowers of sulphur,) sulphate of mercury, and, if desirable, nitric acid also. In forming this liquid a suitable quantity of soda is mixed with water, and then bichromate of potash or bichromate of soda, or a mixture of both, is added, then the blue-stone, then sulphuric acid, and then sulphur and sulphate of mercury, and then, if desirable, nitric acid, or nitric acid can be added instead of sulphuric acid, or a mixture of both can be added, and, if desirable, common salt can also be added. This electrolyte possesses great and many advantages. No nitrous fumes are given off, and a cell will retain its power and run for many hours in a closed circuit. An even current of high voltage is generated. The battery is adapted for either closed or open circuit work. The cost of the battery is very small. A small battery filled with above electrolyte, the glass jar being only five by seven inches, has by actual timing run steadily from one hundred to one hundred and twenty hours.

Having thus fully described my invention, what I claim as new, and desire to secure by Letters Patent of the United States, is—

1. The electrolyte consisting of an alkali, bichromate of potash or bichromate of soda, blue-stone, an exciting-acid, sulphur, and sulphate of mercury.

2. An electrolyte comprising an alkali, an exciting-acid, blue-stone, and bichromate of soda or potash, substantially as described.

3. An electrolyte comprising an alkali, an exciting-acid, blue-stone, bichromate of soda or potash, and sulphate of mercury.

In testimony that I claim the foregoing as my own I affix my signature in presence of two witnesses.

JOHN J. COLLINS.

Witnesses:
H. E. PECK,
C. M. WERLÉ.